(12) United States Patent
Côté et al.

(10) Patent No.: US 7,432,912 B2
(45) Date of Patent: Oct. 7, 2008

(54) POCKET SIZE COMPUTER ADAPTED FOR USE BY A VISUALLY IMPAIRED USER

(75) Inventors: Derek Côté, Boucherville (CA); Gilles Pepin, Drummondville (CA); Lucia Gomez, Montréal (CA); Richard Nadeau, Sherbrooke (CA); Luc Blanchette, Montréal (CA); Maryse Legault, Longueuil (CA); Jacques Desmarais, St-Jean-sur-Richelieu (CA); Pierre Émond, Longueuil (CA); Alain Bélanger, Longueuil (CA); Danny Thibaudeau, Longueuil (CA); Dany Desbiens, Terrebonne (CA); Dominic Labbé, Loretteville (CA); Ivan Lagacé, Verdun (CA); Pierre Hamel, Verdun (CA)

(73) Assignee: Technologies Humanware Canada Inc., Quebec (CA)

( * ) Notice: Subject to any disclaimer, the term of this patent is extended or adjusted under 35 U.S.C. 154(b) by 645 days.

(21) Appl. No.: 11/080,661

(22) Filed: Mar. 16, 2005

(65) Prior Publication Data
US 2005/0206622 A1    Sep. 22, 2005

(30) Foreign Application Priority Data
Mar. 6, 2004   (CA) ................................... 2460943

(51) Int. Cl.
*G09G 5/00* (2006.01)
(52) U.S. Cl. ........................................ 345/169; 345/168
(58) Field of Classification Search ......... 345/156–176; 341/20, 22, 27; 361/686, 685; 400/714, 400/472, 489; 362/23
See application file for complete search history.

(56) References Cited

U.S. PATENT DOCUMENTS

| 4,449,024 | A | * | 5/1984 | Stracener | ..................... 200/317 |
| 5,154,614 | A | | 10/1992 | Matsuoka | |
| 5,557,269 | A | | 9/1996 | Montane | |
| 5,638,257 | A | | 6/1997 | Kumar | |
| 5,874,946 | A | | 2/1999 | Nishijima | |

(Continued)

FOREIGN PATENT DOCUMENTS

JP          62-025312          2/1987

(Continued)

OTHER PUBLICATIONS

Harpo; "BraillePen"; www.harpo.com; Oct. 11, 2004; 3 pages.

(Continued)

*Primary Examiner*—Nitin Patel
(74) *Attorney, Agent, or Firm*—McDermott Will & Emery LLP

(57) ABSTRACT

The adaptation of a regular pocket size computer for use by a visually impaired person is provided. A framework is firstly provided for building adapted applications, having adapted input and output services, a system resources library including tools for interacting with these adapted services and an adaptation library. A tactile keyboard is further provided to allow data entry through the screen interface of the computer. The tactile keyboard includes a membrane having raised keys on one side and corresponding screen activating tips on the other. Means for mounting the keyboard above the computer with the screen activating tips positioned in contact less alignment with the corresponding selected areas of the screen interface are also provided.

22 Claims, 5 Drawing Sheets

U.S. PATENT DOCUMENTS

| | | | |
|---|---|---|---|
| 6,059,575 A | 5/2000 | Murphy | |
| 6,069,444 A * | 5/2000 | Krafcik et al. | 313/510 |
| 6,278,441 B1 | 8/2001 | Gouzman | |
| 6,467,683 B2 * | 10/2002 | Jun | 235/145 R |
| 6,480,377 B2 | 11/2002 | Genest | |
| 6,542,623 B1 | 4/2003 | Kahn | |
| 6,639,510 B1 | 10/2003 | Soulie | |
| 6,671,170 B2 | 12/2003 | Webb | |
| 6,675,028 B1 | 1/2004 | Heie | |
| 6,744,890 B1 | 6/2004 | Le et al. | |
| 7,009,595 B2 * | 3/2006 | Roberts et al. | 345/156 |
| 7,239,700 B2 * | 7/2007 | Fuhrmann et al. | 379/433.11 |
| 7,339,578 B2 * | 3/2008 | Hafez et al. | 345/173 |
| 2003/0122889 A1 | 7/2003 | Romeo | |
| 2003/0151597 A1 * | 8/2003 | Roberts et al. | 345/173 |
| 2003/0184524 A1 | 10/2003 | Stohrer et al. | |
| 2003/0235452 A1 | 12/2003 | Kraus et al. | |
| 2005/0078090 A1 * | 4/2005 | Glatzer et al. | 345/168 |
| 2006/0165465 A1 * | 7/2006 | Wu | 400/491 |
| 2007/0035523 A1 * | 2/2007 | Cohen | 345/169 |

FOREIGN PATENT DOCUMENTS

| | | |
|---|---|---|
| JP | 10-190797 | 7/1998 |
| JP | 2003-163731 | 6/2003 |
| WO | WO 2004/013827 | 2/2004 |
| WO | WO 2004/047050 | 6/2004 |

OTHER PUBLICATIONS

Handy Tech Elektronic GmbH; "Braillino"; www.handytech.de; Nov. 11, 2004; 4 pages.

* cited by examiner

POCKET SIZE COMPUTER ADAPTED FOR USE BY A VISUALLY IMPAIRED USER

FIELD OF THE INVENTION

The present invention relates to the field of computer devices for the blind and more particularly concerns the adaptation of commercially available pocket size computers for use by such visually impaired users.

BACKGROUND OF THE INVENTION

Pocket size computers, such as Pocket PCs, Palms and Blackberrys are very small portable computers, easily hidden in pockets or bags. Such computers are usually provided with a tactile screen enabling users to both enter and receive data without the need for a cumbersome keyboard or other accessories. Contrary to earlier products, pocket size computers now available benefit from very interesting power levels and are inexpensive enough to be accessible to mass market consumers.

Pocket size computers have been designed to be versatile machines capable of accomplishing tasks normally performed by desktop computers. Mostly, though, pocket size computers purchasers wish to organize themselves. Calendar, contacts and note taking are the most popular applications for such devices. Unfortunately blind persons cannot use pocket size computers as they are sold today, even though they are clearly a group of persons that would really benefit from this powerful and versatile tool.

Pocket size computers are clearly designed for sighted users. Both the use of a tactile screen and the design of the applications themselves as they are found on such computers require the user to look at the device in order to use it. Although portable keyboards are available and could be connected to a pocket size computer, most applications require the user to touch the tactile screen from time to time in order to navigate through the offered interfaces. This feature is advantageous for the sighted user, since it simplifies and conceptualizes the intended message or action, but impairs the visually impaired user who cannot know which part of the screen to touch.

Accessories facilitating both input and output of data by a blind user are available and routinely used with desktop computers. However, the operating systems available on pocket size computers are not fit for assistive technologies. For example, screen readers must hook to the system in order to obtain information from the applications in an adapted format. On a computer using Windows XP, a screen reader uses the Microsoft Windows' Active Accessibility (trademark) feature to hook to and query the operating system and to override certain system behaviours. In this manner, the Windows XP operating system enables the use of a Braille keyboard to enter text and commands, and a speech synthesizer or Braille display to obtain information. The use of such technologies is however is impossible for current pocket size computers, as their operating systems do not however not offer the necessary adaptations, tools and hooks.

There is therefore a need for a way to adapt pocket size computers for easy use by visually impaired persons.

SUMMARY OF THE INVENTION

In accordance with a first aspect of the present invention, there is provided a framework for adapting a pocket size computer for use by a visually impaired user. The pocket size computer has an operating system and at least one adapted application usable by the visually impaired user.

The framework includes at least one input service for managing at least one adapted input means usable by the visually impaired user, and at least one output service for managing at least one adapted output means usable by the visually impaired user. A system resources library is provided, including tools for interacting with the at least one input service, the at least one output service and the operating system of the pocket size computer An adaptation library, including adapted controls for building the at least one adapted application on the operating system using the system resources library, is also provided.

The present invention also pertains to the framework as described above in combination with a pocket size computer.

In accordance with a second aspect of the invention, there is also provided a tactile keyboard for facilitating data entry in a pocket size computer by a visually impaired user, the pocket size computer having a screen interface responsive to an interaction with selected areas thereof.

The tactile keyboard includes a membrane having a top and a bottom surface, a plurality of raised keys projecting from the top surface, and a plurality of screen activating tips projecting from the bottom surface in alignment with the keys. Mounting means for mounting the tactile keyboard to the pocket size computer are also provided. The mounting means include a frame supporting the membrane and engageable with the pocket size computer to extend in contactless alignment over the screen interface, with the screen activating tips positioned above the selected areas. In this manner, pressing any of the keys activates a corresponding selected area of the tactile screen.

The tactile keyboard as described above is also provided in combination with the pocket size computer. Preferably, the pocket size computer is provided with a keyboard service converting the activation of the selected areas of the screen interface into usable commands.

Other features and advantages of the present invention will be better understood upon reading of preferred embodiments thereof with reference to the appended drawings.

DESCRIPTION OF PREFERRED EMBODIMENTS OF THE INVENTION

The present invention advantageously provides for the adaptation of a regular, "off the shelf" pocket size computer for use by a visually impaired person. Throughout the present description, it is understood that the expression "adapted" refers to the modification or replacement of a given device or software for use by such a person. By "visually impaired" it is meant any person unable or unwilling to interact with a pocket size computer through a visual interface.

Figure 1B:
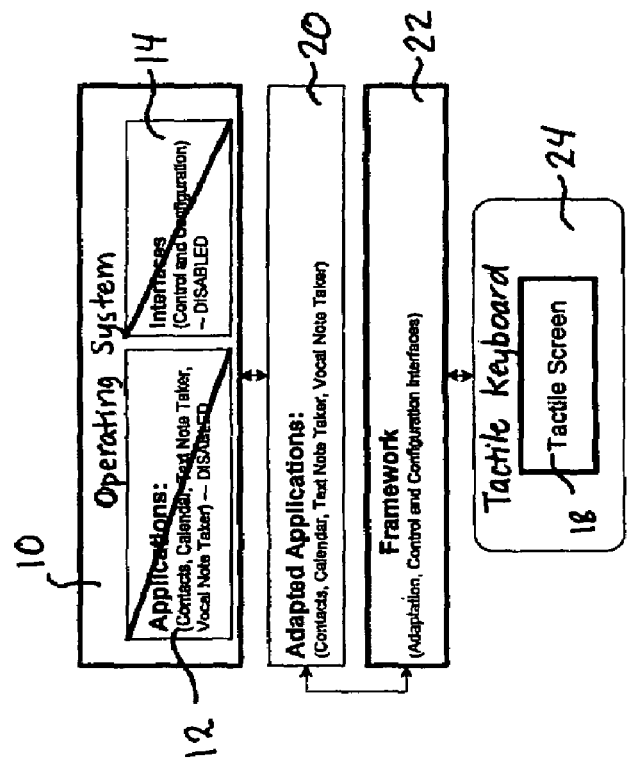
FIG. 1B is a similar diagram for a pocket size computer adapted according to a preferred embodiment of the present invention.
Figure 1A:
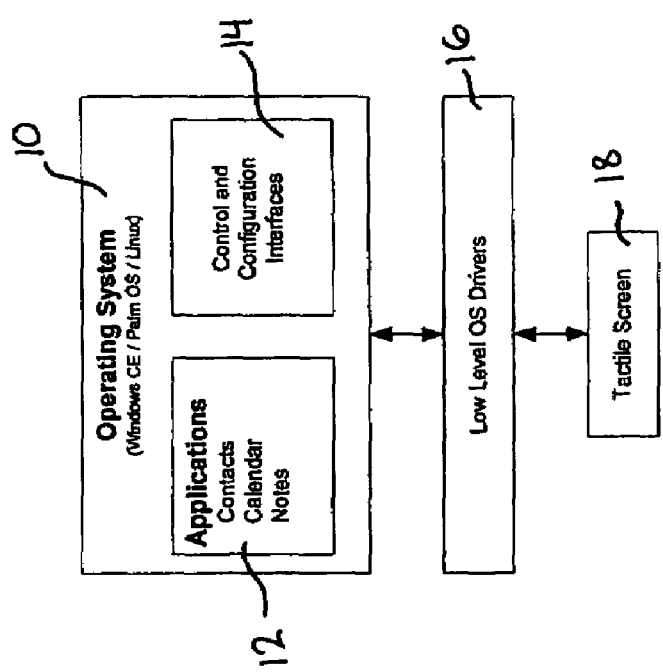
FIG. 1A is a diagram showing the functional structure of regular pocket-size computer.

Referring to FIGS. 1A and 1B, the functional structure of an adapted pocket size computer according to an embodiment of the present invention is compared to the structure of a regular pocket size computer. By "regular", it is meant any such small computer intended for use by the persons able to see the device. FIG. 1A shows a simplified representation of the functional parts in a regular pocket size computer. It includes an operating system 10, such as for example Windows CE, Palm OS or Linux, which offers the support needed for applications to live on the hardware. Such applications 12, for use by sighted users, are also included and may provide contacts management, a calendar, note taking, or any other function the user may wish to accomplish on a pocket size computer. All the control and configuration interfaces 14 necessary so the user can manage the pocket size computer are further provided.

Closer to the hardware level are provided low level drivers 16 which communicate with specific hardware such as video adapters, sound adapters, external keyboards, wireless communications and so on. In the illustrated computer structure, the main interface between the user and the applications is a touch screen 18.

Regular applications found in pocket size computers are not designed to be used exclusively through a keyboard, and do not offer a talking or Braille interface so that blind users can have access to the information offered by those applications. New "adapted" applications therefore have to be developed in order to allow blind users access to the same functions. Moreover, regular applications run under Windows CE or another standard operating system, which are very different from a PC Windows operating system that enables the development of assistive technologies, for example through Microsoft Active Accessibility. With Windows CE there is no way to get to all the information a regular application presents to its user and there is no documented way to inject commands and text directly to a regular application.

An adapted framework has therefore been developed to remedy to these difficulties.

FIG. 1B shows a simplified representation of the functional parts in an adapted pocket size computer. The regular applications 12 and interfaces 14 are disabled to the user, and are replaced by adapted applications 20 and a framework 22 according to a first aspect of the present invention. To enable the visually impaired to use the tactile screen 18, a tactile keyboard 24 is provided according to a second aspect of the invention.

Adapted Framework

Figure 2:
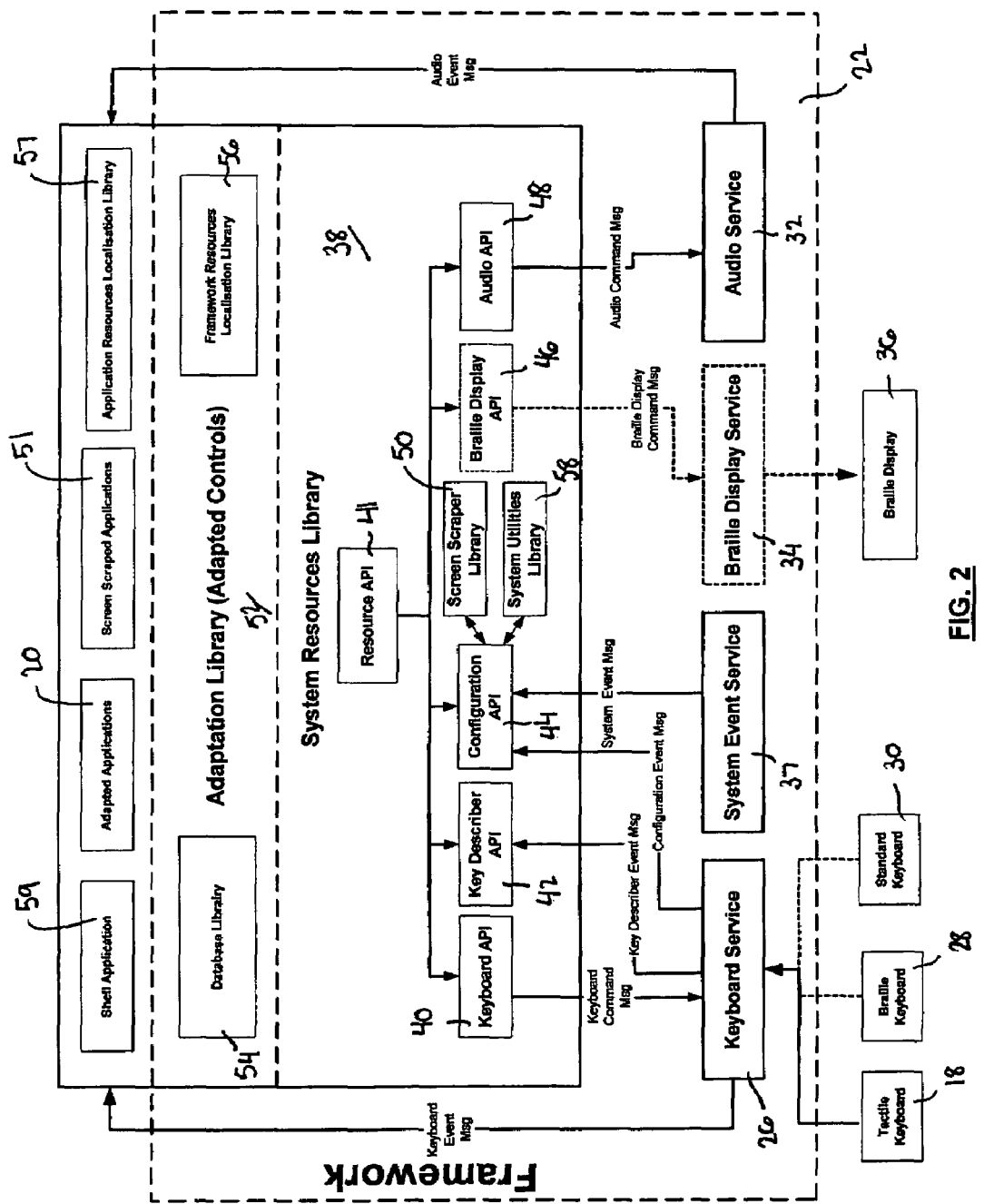
FIG. 2 is a diagram showing the detailed software architecture of a pocket size computer adapted according to a preferred embodiment of the invention.

Referring to FIG. 2, the adapted framework 22 according to a first aspect of the present invention will now be described.

As explained above, the operating systems of pocket size computers do not provide all the tools necessary to run adapted applications and use adapted input and output accessories. Consequently, the framework of the present invention has been designed to make the development and use of those adapted applications and interfaces possible. Preferably, this framework takes care of all the adaptation techniques so that simple applications can be adapted almost directly; it hooks the operating system wherever possible, gathers information by inserting itself between operating system controls and the applications, and controls the operating system and external devices. In a preferred embodiment, the framework has been realised for cooperating with the Windows CE operating system, but it is understood that the present invention is not limited thereto.

For a blind user to use a pocket size computer, adapted input and output devices are needed. Such devices are already available for use with desktop computers such as a regular external keyboard, an external Braille keyboard, an external Braille and Braille terminal, an external QWERTY and Braille terminal as well as various audio output devices. Those devices communicate with a pocket size computer through wireless communication interfaces or through a direct physical connection. A new input device cooperating with the tactile screen of a pocket size computer is also disclosed hereinbelow.

The framework 22 according to the first aspect of the present invention includes at least one input service and at least one output service for respectively managing adapted input and output means as described above. Preferably, the input services include a keyboard service 26 which, in the illustrated embodiment, manages a tactile screen 18, a Braille keyboard 28 and a regular keyboard 30, for example of the QWERTY or ASERTY type. In a preferred embodiment, the keyboard service is configures through XML files in order to support different new tactile or external keyboards, to offer different Braille tables or to offer different telephone keypad key associations. The keyboard service preferably sends information directly to the adapted application through keyboard event messages.

The output services preferably include an audio service 32 managing an audio output according to technologies well known in the field. In the preferred embodiment, the audio service 32 supports Text-To-Speech (TTS) and WAVE files, and offers a powerful priority oriented queuing management for audio messages. Preferably, it further benefits from multi-synthesizer and multi-language capabilities.

Alternatively or additionally, the output services may also include a Braille display service 34 managing the output to Braille displays 36 communicating through Bluetooth technology or otherwise.

Additionally to the input and output services, the framework 22 preferably further includes a system event service 37 managing system events generated by the operating system. For example, in Windows CE most system events take the form of popup windows informing the user about a situation or prompting the user for action. A "battery-low" warning is in example of such an event. The system event service detects these popup windows and acts on them accordingly.

The framework according to the present invention also includes a system resources library 38, which provides tools for interacting with the input services, the output services and the operating system of the pocket size computer. In the preferred embodiment, the system resources library 38 offers several APIs written in C++ and offering simple but powerful interfaces for system resources management. Preferably, the following interfaces are provided:

A resource API 41 for accessing the tools of the system resources library;

A keyboard API 40 giving access to the keyboard service 26. Preferably, an application can configure this service to receive keyboard information following certain rules (regular mode, game mode). An application can also switch between different keyboard modes, for example from Braille to telephone-style text entry. Through the keyboard API 40, an application can completely redefine the keys from all the available keyboards.

A key describer API 42 for turning the keyboard into describer mode, to help the user know the different available keys.

A Configuration API 44, giving a wide range of methods for configuring the system. It interacts with both the system event service 37 and the operating system of the computer. It may also configure a keyboard through the keyboard service. Through this API, various parameters may be changed such as the system date, the system time, the backlight level, buttons assignment and so on.

A Braille display API 46 interacting with the Braille display service 34, which lets an application communicate with a Braille display 36 if there is one available.

An audio API 48 giving access to the audio service 32. Through this resource, an adapted application can use audio capabilities such as Text-To-Speech and WAVE outputs. Preferably, this API further allows an application to configure audio parameters such as volume, pitch, rate, etc, or send text messages, text file messages, WAVE messages, beeps and so on.

Preferably, the framework 22 further comprises a screen scraper library 50 simulating a user interaction with the pocket size computer to accomplish configuration tasks which cannot be directly accomplished by the configuration API. In the preferred embodiment, the core part of the system resources library uses low level access to the operating system of the pocket-size computer and the adapted resources and services of the framework. Several configuration tasks it has to perform are not however generally available through usual means, such as Windows CE APIs, libraries or interfaces. In such instances, the screen scraper library 50 uses a convenient technique to bypass these difficulties. This technique uses an external regular user interface, the scrapped application 51, capable of executing the needed configuration task. To accomplish this task, the system resource library 38 starts the screen scrapped application 51 which opens the regular user interface through which it can be done, and then uses the screen scrapper library 50 to simulate user commands.

Still referring to FIG. 2, the framework 22 further provides an adaptation library 52 including adapted controls for building the adapted applications 20 on the pocket size computer's operating system, using the APIs of the system resources library 38. The adaptation library 52 is designed to help develop adapted applications which can run on the pocket size computer.

In the preferred embodiment of the invention, built around the Microsoft Windows CE operating system, the adaptation library 52 offers a set of adapted Windows CE controls such as buttons, edit boxes and combo boxes. They are implemented in C++ classes that specialize the original Windows CE controls. They are used in much the same way a programmer would use Microsoft Foundation Classes (MFC) controls, except that they feature adaptation functionalities and behaviours.

The adaptation library also offer MFC compatible specialized controls such as "Multifield Edit", which presents more complex information in a way blind users can easily cope with. Those adapted controls can be used directly within the adapted applications 20 or they can be further specialized.

Still in the preferred embodiment, the adaptation library offers the following APIs:

A database API 54 interacting with information databases on the pocket size computer containing information used in the adapted application. Preferably, the database API 54 gives access to the POOM (Pocket Outlook Object Model) database, which is used to maintain information throughout Pocket Outlook applications (Calendar, Email, Contacts). In this manner, the adapted applications 20 manage information also available to sighted persons on the pocket size computer.

An application resources localisation library 57 provides support for several languages and locales to adapted applications 20. It preferably contains all the user messages which need localization. The framework resources localisation library 56 provides support for several languages and locales to the framework. It preferably contains all the framework's user messages which need localization. In this manner, the framework may be used by adapted application in several languages and locales.

A system utilities library giving access to system resources. Through this library, a programmer can query and manage system components such as the battery, the memory, communication ports, the system clock and so on.

In the preferred embodiment of the invention, there is provided a shell application 59 for launching the adapted applications on the pocket size computer. Preferably, the shell application runs at the application layer level. It has the visual form of a system bar visible at top of tactile screen of the pocket size computer. A user can access the system bar at any time and from anywhere by using a dedicated keyboard shortcut. The system bar includes configuration buttons (Clock, Memory, Battery, etc), a system menu and a nice background.

The System Menu offers shortcuts to installed adapted applications to launch them, a configuration panel, an exit command to exit the "adapted" mode and help on the adapted system and its applications.

The configuration panel offers configuration interfaces for various parameters, such as backlight control, Bluetooth control, buttons assignation, clock setting, factory defaults, input tables, keyboard, memory management, owner information, power saving, reading and text typing control, running programs control, sounds and notifications, or voice settings.

In accordance with the present invention, the framework as described above is preferably provided in combination with a pocket size computer which has an operating system and at least one "regular" application already provided thereon. It is highly advantageous that this computer, in addition to be usable by a blind person, be also usable normally by a sighted person.

In summary, the framework according to the first aspect of the present invention offers flexible and easy-to-use environment and tools so that adapted application development can be easy and straightforward Since pocket size computers are not adapted for use by visually impaired users and do not offer the hooks and tools needed to make them adapted, it is the framework as described above which provides an environment where adapted applications can live. Preferably, the Framework is available for third party applications so that the adapted pocket size computer can be an open environment.

A framework as described above has been developed by the inventors in a Windows CE environment. This particular embodiment of the invention has the following advantageous features:

The framework brings new means of communication to the pocket size computer, such as speech synthesis and Braille input/output.

The framework encapsulates different objects of the computer's operating system, and relays the information between those objects and the user by using an adapted communication interface (speech and Braille). The framework encapsulates dialog boxes, controls, application views, menus and other Windows CE objects this way. In FIG. 2, those encapsulations are done in the adaptation library 52.

The framework replaces several interfaces of Windows CE with adapted interfaces. Configuration interfaces such as the WiFi configuration interface, the Bluetooth configuration interface, the power management interface and the like must be replaced so that blind users can control their device. In FIG. 2, those interfaces are replaced by the Configuration API 44 part of the framework. The Configuration API 44 offers its own adapted interfaces.

The framework provides support for the tactile keyboard. As further described in the next section hereinbelow, the tactile keyboard is a sleeve over the pocket size computer that offers keys that a blind user can use to enter commands and text. When the user presses a button on the tactile keyboard, the touch screen coordinates of the contact point is converted into a virtual key that is passed through the framework. One or several of those virtual keys can be converted into a Windows CE virtual key that is sent to the application through Windows CE. In FIG. 2, the tactile keyboard is supported through the keyboard service 26.

The framework provides support for alternate text and command entry devices like external keyboards that can be bought anywhere. Those devices have to be monitored so that feedback can be sent to the user as to what has been pressed and what happened after the command passed through Windows CE and the adapted applications. In order to do so, there has to be a direct software link between the Windows CE objects encapsulated by the framework and the external device. This link is a soft link, that is, which can be broken without impairing the application running, using Windows CE messages architecture to funnel the information. In FIG. 2, this is done by the keyboard service 26.

The framework drives specialized external devices such as a Braille display and a Braille keyboard to make them available for all applications running on the device. The communication between those devices and the applications is totally transparent. It uses Windows CE as the communication channel so that an application thinks it is talking with a regular keyboard or a regular display. In FIG. 2, this is done by the keyboard service 26.

The framework can control, through Windows CE Bluetooth capability (when present), an external wireless headset so that a blind person can use the adapted pocket size computer without disturbing other persons with the speech interface. In FIG. 2, the configuration API 44 does this.

The framework has also been developed with portability in mind. It can be ported to mobile computing on certain cellular phones.

Tactile Keyboard

In accordance with another aspect of the invention, there is provided a tactile keyboard for facilitating data entry by a visually impaired person in a pocket size computer.

Pocket size computers are usually provided with a screen interface through which information is both inputted and outputted. A popular form of such an interface is a touch screen, which is responsive to pressure applied to selected areas of the screen. As another example, also known in the art magnetically activated screens where selected areas of the screen are activated by a small magnet provided at the extremity of a pen or other appropriate device. Any screen interface is of course unusable by a visually impaired person, who cannot know the location of the selected areas on the screen. Referring to FIGS. 3, 4A, 4B, 5A and 5B the present invention therefore provides a tactile keyboard 24 which serves as a user interface between the blind user and the screen interface of the computer.

The tactile keyboard 24 according to the present invention first includes a membrane 60. The membrane has a top surface 62 from which project raised keys 66. From the bottom surface 64 project a plurality of screen activating tips 68 (see FIG. 4B), which are disposed in alignment with the keys 66. The membrane is preferably made of silicone. In the preferred embodiment, the position of the keys on the membrane is designed so that the membrane can be used by either hand. The form, texture, dimensions and colors of each key are preferably chosen to help differentiation by a blind user. Exemplary designs and assignations for the keys 66 will be given further hereinbelow.

Figure 3:
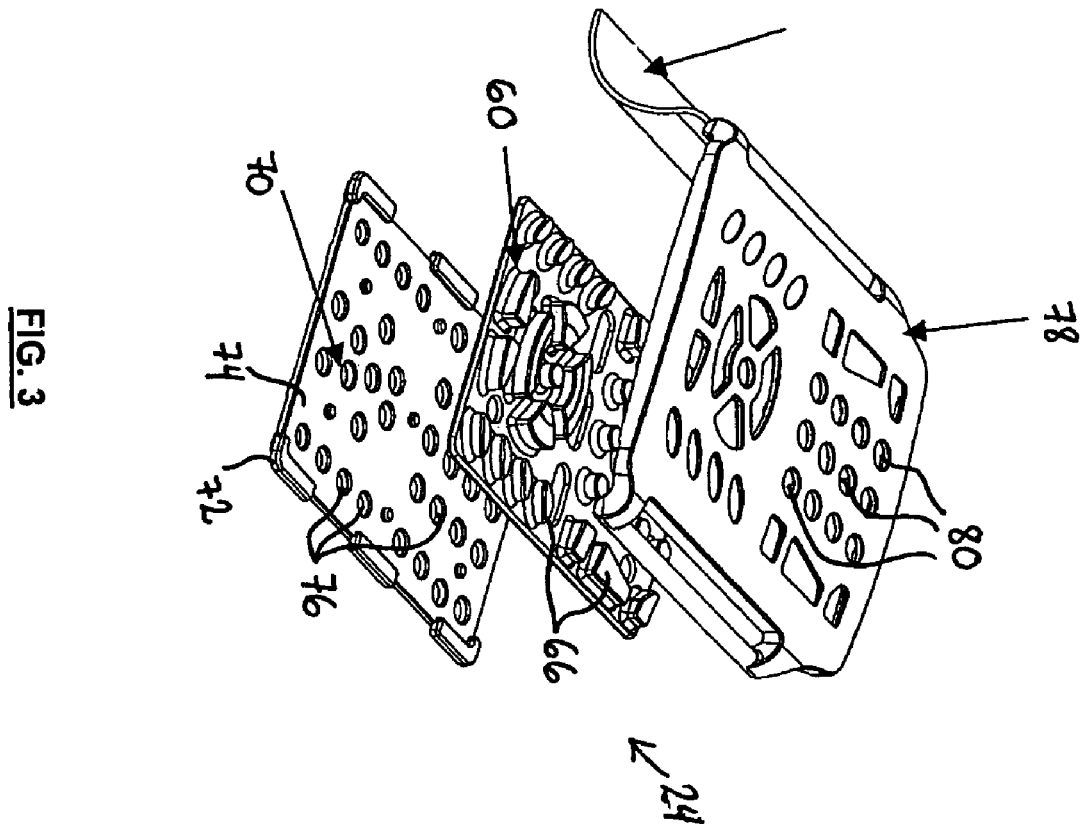
FIG. 3 is a perspective exploded view of a tactile keyboard according to another aspect of the present invention.
Figures 4A, 4B:
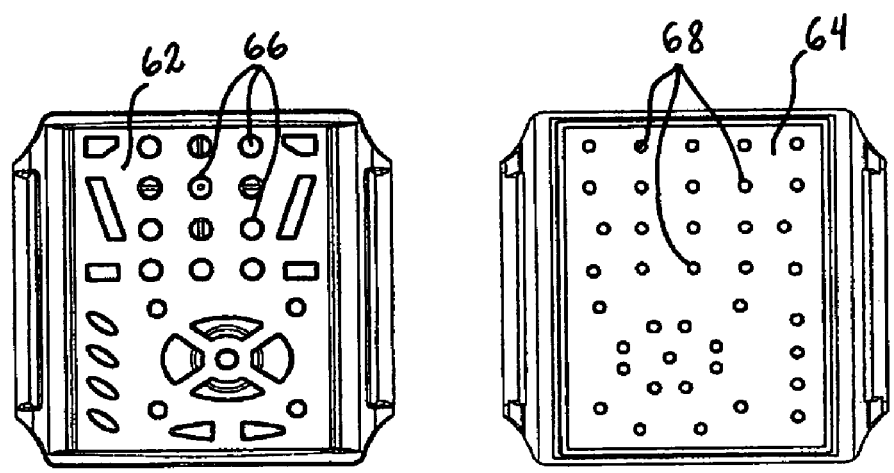
FIGS. 4A and 4B are respectively top and bottom views of the tactile keyboard of FIG. 3 and having an alternate design.
Figure 5A:
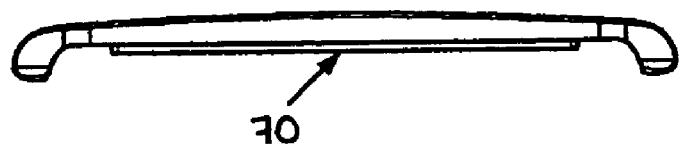
FIGS. 5A and 5B are respectively a side and a perspective view of the tactile keyboard of FIGS. 4A and 4B.

The tactile keyboard 24 is mountable to the pocket size computer through an appropriate mounting mechanism, which includes a frame 70 supporting the membrane 60. Referring to FIGS. 3 and 5, in the preferred embodiment, the frame 70 has a border portion 72 which is sized to engage the pocket size computer around the tactile screen in a close fit. In this manner, the frame extends in alignment over the tactile screen without any contact therewith. Still in the preferred embodiment, the border portion 72 of the frame 70 forms a rectangle which abuts on the walls surrounding the screen of the computer, providing for an automatic proper positioning of the tactile keyboard and preventing it from moving out of position. When the tactile keyboard is properly mounted on the computer the screen activating tips are positioned above the selected areas of the tactile screen, so that pressing any of the keys 66 activates a corresponding selected area of the screen interface. In the illustrated embodiment, the screen interface is a touch screen and the screen activating tips will apply a pressure to the selected areas of this touch screen in order to activate them. It is however understood that the screen activating tips could also be adapted to other types of screen interface, for example by providing them with small magnets for interacting with magnetic-based interfaces.

The frame 70 is preferably made from a harder material than the membrane 60 in order to keep its position and form exactly. The frame 70 preferably includes a sheet portion 74 enclosed within the border portion 72 and having openings 76 through which project the screen contacting tips.

The mounting mechanism also preferably includes a sleeve 78 which extends over the membrane. Both the sleeve 78 and the frame 70 are preferably made of plastic and attached together by means of glue, with the membrane 60 securely held in-between. Similarly to the frame 70, the sleeve 78 has openings 80 therein, this time receiving the raised keys 66 therethrough.

The sleeve 78 preferably has opposite side wing portions 82 which project laterally beyond the sides of the pocket size computer, and define lateral slots 86 on each side. An elastic belt 84 is attached to both of these side wings portions 82 through the slots 86 and extends underneath the keyboard 24 to apply a slight downward pressure on the side wing portions 82 of the sleeve 78. In this manner, the center of the membrane tends to go up a few millimetres, and the elastic belt 84 both maintains the tactile keyboard in place on the pocket size computer and ensures that there is not unintentional contact between the membrane of the tactile screen.

This use of an elastic belt simplifies the manipulations of the tactile keyboard when it needs to be installed on the pocket size computer. The user only has to slide the pocket size computer in the loop defined by the belt until the frame clicks into place above the tactile screen. The tactile keyboard may then be removed from the computer by pulling on the elastic belt and sliding the computer out. Both these operations can be easily performed by a blind person.

Advantageously, the tactile keyboard of the present invention has no electronic part. Its mechanic parts are designed so that the pocket size computer does all the electronic work. When a user presses a key on the membrane, the screen contacting tip underneath the key moves down and touches the tactile screen. The pocket size compute is preferably provided with a keyboard service, preferably as part of a framework as described above, which interprets this pressure as a usable command. This commend is preferably embodied by a Windows CE keyboard event, which is injected in Windows CE. Ultimately, the application running on the computer receives the information as a regular key pressed.

Figure 7:
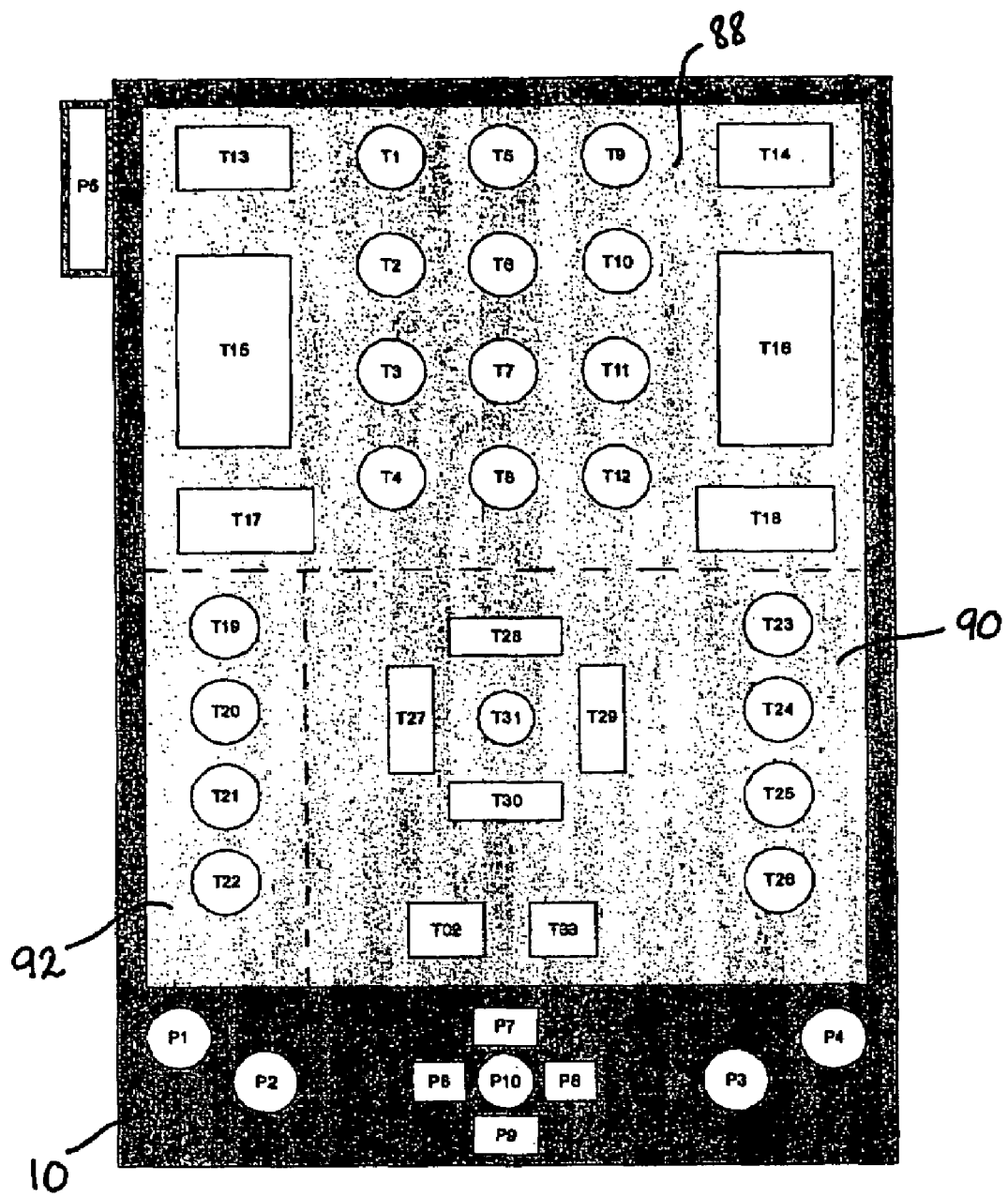
FIG. 7 is a diagram mapping the keys on a pocket size computer provided with a tactile keyboard according to a preferred embodiment of the invention.

Referring to FIG. 7, a preferred distribution and allocation of the raised keys 66 on the membrane 60 will now be described.

In accordance with a preferred embodiment of the invention, the keys are distributed on the membrane so as to form three dedicated zones, respectively defining a text entry zone 88, a navigation zone 90 and a functions zone 92. This division helps the user remember key locations and functions.

The text entry zone 88 preferably includes a 3×4 matrix of text entry keys (T1 to T12) which can be configures to either be used for entry of Braille characters or for telephone keypad-style text entry. For a Braille configurations, the first two columns of the matrix are preferably used, with Braille dots 1, 2, 3 and 7 located on column 1 (keys T1-T4), and Braille dots 4, 5, 6 and 8 on column 2 (keys T5-T8). For telephone keypad-style entry characters are positioned on the keys the same way they are positioned on a regular telephone.

Preferably, the text entry zone further includes at least one Validate key. In the preferred embodiment, two such keys (T15 and T16) are provided and positioned on either side of the text entry keys, facilitating the use of this function by either left or right-handed users. To enter a given character, a combination of different text entry keys are consecutively pressed in Braille configuration or a same key is pressed a pre-determined number of times in telephone keypad-style mode. In the preferred embodiment, after each such sequence one of the Validate key is pressed to validate the character entry.

The text entry zone further preferably includes Backspace key T13, and a Delete key T14. A Tell key T18 may be provided for the user to get information on certain UI elements in an adapted application. A Spell key T17 may additionally or alternatively be provided for the same purpose, with the difference that the information is spelled instead of being spoken.

The Navigation zone 90 offers much the same keys a regular keyboard would. Those keys are used to navigate in dialogue boxes, in controls and in text views. It preferably includes keys corresponding to direction arrows for navigating in the up (T28), down (T30), left (T27) and right (T29) directions, a Page Up key (T24), a Page Down key (T25), Home (T23) and End keys (T26).

Tab (T33) and Shift-Tab (T32) keys are also optionally provided. The Shift-Tab key is not found in a regular keyboard. It is mainly used to navigate from element to previous element in a user interface. It is the counter part of the Tab key, which is used to navigate from element to element in a user interface.

The keys of the functions zone (T19-T22) are preferably associated with any appropriate pre-programmed command functions. They may be used by themselves or in conjunction with the shift key (P3) and control key (P2) generally provided on the pocket size computer itself. Table 1 below shows a non-exhaustive list of functions associated to function keys:

TABLE 1

List of functions associated to function keys

| | |
|---|---|
| F1 | Information on where the user is in his interface. |
| F2 | Informs the user of the current window title. |
| F3 | Opens the current application's menu. |
| F4 | Opens the Adapted Pocket Size Computer's system menu |
| CTRL + F1 | Starts the Contacts application |
| CTRL + F2 | Starts the Calendar application |
| CTRL + F3 | Starts the Text Notes application |
| CTRL + F4 | Starts the Vocal Notes application |
| Shift + F3 | Says the controls in the dialog box in their correct tab order |
| F1 Press & Hold | Toggles the Key describer mode where the system will give help information on every key pressed instead of executing its function. |
| F2 Press & Hold | Status Information |
| F3 Press & Hold | Opens a contextual menu if one is define for the current user context. |

Figure 6A:
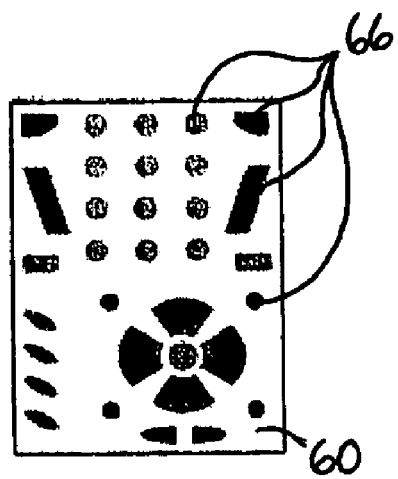
FIGS. 6A and 6B show alternative designs of the membrane of a tactile keyboard as shown in FIG. 3.
Figure 6B:
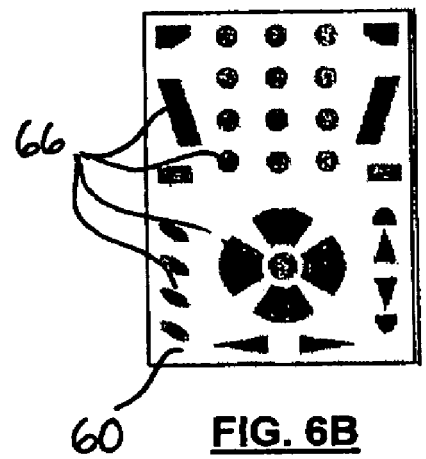
Figure 5B:
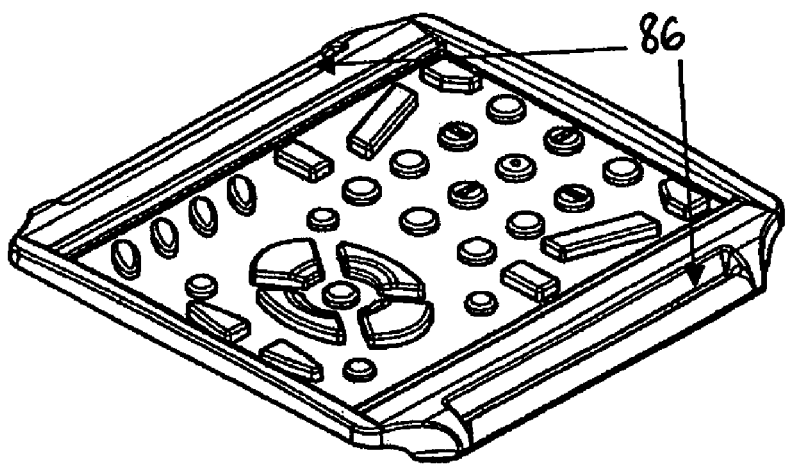

In the embodiment of FIG. 7, the keys are distributed on the membrane so that the upper portion defines the text entry zone, the lower left portion defines the functions zone and the lower right portion defines the navigation zone. The placement of the keys within these zones has been designed to optimize the number of keys on a small surface in order to offer a maximum of functionalities. Of course, different other configurations could be used without departing from the scope of the present invention. Referring to FIGS. 6A and 6B, there are shown alternative manners considered to distribute the keys 66 on the membrane 60.

The tactile keyboard according to the present invention advantageously provides a convenient and compact interface for interacting with a pocket size computer without the use of one's eyes. Preferably, the size, texture and height of the keys are chosen to optimize the speed at which a user will find and recognize them using his fingers. The responsiveness and the bounce back of the keys have been designed so that a user can use his fingers to explore the keyboard without pressing keys by error.

In the preferred embodiment, the construction of the keyboard makes it easy for a blind person to install and remove it. The materials used to make the keyboard are preferably chosen for their strength, flexibility, durability and cheap price.

Of course, numerous modifications could be made to the embodiments above without departing from the scope of the present invention as defined in the appended claims.

The invention claimed is:

1. A tactile keyboard for facilitating data entry in a pocket size computer by a visually impaired user, said pocket size computer having a screen interface responsive to an interaction with selected areas thereof, the tactile keyboard comprising:

a membrane having a top and a bottom surface, a plurality of raised keys projecting from said top surface and a plurality of screen activating tips projecting from the bottom surface in alignment with said keys; and mounting means for mounting said tactile keyboard to said pocket size computer, the mounting means comprising:

a frame supporting said membrane and engageable with the pocket size computer to extend in contact less alignment over the screen interface with said screen activating tips positioned above said selected areas, so that pressing any of said keys activates a corresponding selected area of the screen interface, said frame comprising a border portion sized to engage said pocket size computer around said screen interface in a close fit, and a sheet portion enclosed within said border portion and having openings therein receiving said screen contacting tips therethrough; and a sleeve extending over the membrane and having opening therein receiving said raised keys therethrough.

2. The tactile keyboard according to claim 1, wherein the sleeve is secured to the frame by glue.

3. The tactile keyboard according to claim 2, wherein the membrane is securely held between said frame and said sleeve.

4. The tactile keyboard according to claim 2, wherein said sleeve comprises opposite side wing portions projecting laterally beyond sides of said pocket size computer when said tactile keyboard is mounted thereon.

5. The tactile keyboard according to claim 4, wherein said mounting means further comprise an elastic belt having opposite ends respectively attached to the opposite side wing portions of the sleeve.

6. The tactile keyboard according to claim 1, wherein said keys are distributed on said membrane so as to form dedicated zones, said dedicated zones comprising a text entry zone, a navigation zone and a functions zone.

7. The tactile keyboard according to claim 6, wherein at least a portion of the keys positioned in said text entry zone are configured for entry of Braille characters.

8. The tactile keyboard according to claim 6, wherein at least a portion of the keys positioned in said text entry zone are configured for telephone keypad-style text entry.

9. The tactile keyboard according to claim 6, wherein the keys of said text entry zone comprise:

text entry keys, entry of text characters being associated with pressing said text entry keys according to pre-determined sequences; and at least one Validate key, pressing said Validate key being associated with validating a pressed pre-determined sequence of text entry keys.

10. The tactile keyboard according to claim 9, wherein two of said at least one Validate key are provided, said two Validate keys being positioned on opposite sides of said text entry keys.

11. The tactile keyboard according to claim 9, wherein said text entry keys are distributed on said membrane so as to form a telephone keypad configuration, and said predetermined sequences comprise pressing one of said text entry keys a number of times.

12. The tactile keyboard according to claim 9, wherein said text entry keys are distributed on said membrane so as to form a Braille configuration, and said predetermined sequences comprise consecutively pressing a number of said text entry keys.

13. The tactile keyboard according to claim 6, wherein at least one of the keys positioned in said text entry zone is selected from the group consisting of a delete key, a backspace key, a spell key and a tell key.

14. The tactile keyboard according to claim 6, wherein at least a portion of the keys positioned in said navigation zone are direction arrows.

15. The tactile keyboard according to claim 14, wherein said direction arrows respectively navigate in the up, down, left and right directions.

16. The tactile keyboard according to claim 6, wherein at least one of the keys positioned in the navigation area is selected from the group consisting of a Home key, a Page Up key, a Page Down key, and an End key.

17. The tactile keyboard according to claim 6, wherein at least one of the keys positioned in the navigation area is a Tab key for navigating from one element to a next element in a user interface.

18. The tactile keyboard according to claim 6, wherein at least one of the keys positioned in the navigation area is a Shift-Tab key for navigating from one element to a previous element in a user interface.

19. The tactile keyboard according to claim 6, wherein at least a portion of the keys positioned in said function zone are associated with pre-programmed command functions.

20. The tactile keyboard according to claim 6, wherein said membrane has an upper and a lower portion, the upper portion defining the text entry zone, and the lower portion having opposite sides defining the navigation zone and the functions zone.

21. The tactile keyboard according to claim 1 in combination with said pocket size computer, wherein said pocket size computer is provided with a keyboard service converting said activation of the selected areas of the screen interface into usable commands.

22. The combination according to claim 21, wherein said screen interface of the pocket size computer is a touch screen responsive to pressure applied to said selected areas thereof.

* * * * *

UNITED STATES PATENT AND TRADEMARK OFFICE
CERTIFICATE OF CORRECTION

PATENT NO. : 7,432,912 B2 Page 1 of 1
APPLICATION NO. : 11/080661
DATED : October 7, 2008
INVENTOR(S) : Derek Cote et al.

It is certified that error appears in the above-identified patent and that said Letters Patent is hereby corrected as shown below:

On the title page of the patent,

In Item "(30) Foreign Application Priority Data", change the priority date from "Mar. 6, 2004" to --Mar. 16, 2004--; and In Item "(56) References Cited", under "Foreign Patent Documents" add --WO   2001/013827   02/2004--.

Signed and Sealed this

Thirty-first Day of March, 2009

JOHN DOLL
*Acting Director of the United States Patent and Trademark Office*